United States Patent
Valdes Garcia et al.

(10) Patent No.: US 11,073,610 B2
(45) Date of Patent: Jul. 27, 2021

(54) PORTABLE IMAGER

(71) Applicant: International Business Machines Corporation, Armonk, NY (US)

(72) Inventors: Alberto Valdes Garcia, Chappaqua, NY (US); Divya Gopinath, White Plains, NY (US); Yahya Mesgarpour Tousi, White Plains, NY (US); Daniel Joseph Friedman, Sleepy Hollow, NY (US); Ismael Faro Sertage, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 16/263,085

(22) Filed: Jan. 31, 2019

(65) Prior Publication Data

US 2020/0249341 A1 Aug. 6, 2020

(51) Int. Cl.
*G01S 13/88* (2006.01)
*G01S 13/42* (2006.01)
*G01S 7/03* (2006.01)
*G01S 13/90* (2006.01)
(Continued)

(52) U.S. Cl.
CPC .............. *G01S 13/887* (2013.01); *G01S 7/03* (2013.01); *G01S 13/42* (2013.01); *G01S 13/867* (2013.01);
(Continued)

(58) Field of Classification Search
CPC ...... G01S 13/867; G01S 13/931; G01S 13/89; G01S 13/42; G01S 13/86; G01S 7/40;
(Continued)

(56) References Cited

U.S. PATENT DOCUMENTS 7,978,124 B2 7/2011 Cook et al.
8,253,619 B2 8/2012 Holbrook et al.
(Continued)

FOREIGN PATENT DOCUMENTS

WO 2007029226 A2 3/2007
WO 2007061322 A1 5/2007

OTHER PUBLICATIONS

ManTech Advanced Systems International, Inc. "Through-the-Wall Sensors for Law Enforcement," Oct. 2012, 31 pages.
(Continued)

*Primary Examiner* — Olumide Ajibade Akonai
(74) *Attorney, Agent, or Firm* — Patterson + Sheridan, LLP

(57) ABSTRACT

Embodiments provide for a portable imager by capturing several radar readings related to an object in an environment over several times from several of Points of View (POV), wherein each radar reading indicates a distance to and reflectivity of the object relative to the imager; capturing several camera images of the environment over the several of times from the several POVs; determining positional shifts of the imager over the several times based on photogrammetrical differences between subsequent camera images of the several camera images; determining, based on accelerometer data, a trajectory that the imager moves in the environment over the several times; determining positions of the imager in the environment over the several times based on the positional shifts and the trajectory; combining the several radar readings based on the positions to produce a synthetic aperture radar image of the object; and outputting the synthetic aperture radar image.

20 Claims, 5 Drawing Sheets

(51) Int. Cl.
*G01S 13/86* (2006.01)
*G01S 7/04* (2006.01)
*G01S 13/931* (2020.01)
*G01S 13/89* (2006.01)

(52) U.S. Cl.
CPC .............. *G01S 13/904* (2019.05); *G01S 7/04* (2013.01); *G01S 13/865* (2013.01); *G01S 13/89* (2013.01); *G01S 13/931* (2013.01)

(58) Field of Classification Search
CPC ...... G01S 7/4808; G01S 13/426; G01S 17/89; G01S 13/904; G01S 13/9005; G01S 13/9056; G01S 13/9089; G01S 7/03; G01S 13/58; G01S 13/726; B60W 2420/42; B60W 2420/52

See application file for complete search history.

(56) References Cited

U.S. PATENT DOCUMENTS

| | | |
|---|---|---|
| 8,593,329 B2 | 11/2013 | Mohamadi et al. |
| 9,316,727 B2 | 4/2016 | Sentelle et al. |
| 2004/0056966 A1* | 3/2004 | Schechner ................ G06T 7/80 348/229.1 |
| 2006/0091654 A1* | 5/2006 | De Mersseman ..... G01S 13/867 280/735 |
| 2009/0195435 A1 | 8/2009 | Kapilevich et al. |
| 2010/0191391 A1* | 7/2010 | Zeng ....................... G01S 13/87 701/1 |
| 2011/0102234 A1 | 5/2011 | Adams et al. |
| 2012/0127028 A1* | 5/2012 | Bamler ................ G01S 13/9027 342/25 C |
| 2012/0313808 A1 | 12/2012 | Frohling |
| 2014/0035775 A1* | 2/2014 | Zeng .................... G01S 13/931 342/52 |
| 2017/0262716 A1* | 9/2017 | Matsumoto ........ G06K 9/00798 |
| 2017/0307751 A1* | 10/2017 | Rohani .................... G01S 17/89 |
| 2018/0067204 A1* | 3/2018 | Frizzell ................ G01S 13/887 |
| 2020/0300969 A1* | 9/2020 | Masui .................... G01S 13/42 |

OTHER PUBLICATIONS

"ee Through Wall radar imaging Technology" [Accessed Online Dec. 3, 2018] https://redecomposition.wordpress.com/technology/.

* cited by examiner

PORTABLE IMAGER

BACKGROUND

The present invention relates to radar imaging, and more specifically, to improvements in providing radar images. When imaging objects using radio waves, radio waves that are reflected off of those objects in the environment are collected to form a radio image of the objects. The imaging technologies that collect the reflected signals to form the radio image, to ensure that the radio image is recognizable or covers all of an imaged object, may use a large aperture receiving antenna, or emulate having a larger aperture receiving antenna than is actually in use by using a phased array (using a beam scanned electronically from a fixed position to view different parts of the environment) or a synthetic aperture (using a single beam that is physically moved to different positions in the environment to view different parts of the environment).

SUMMARY

According to one embodiment of the present invention, a method of operation for a portable imager is provided, the method including: at a first time: capturing a first radio image of an object in an environment from a first point of view; and capturing a first camera image of the environment from the first point of view; and at a second time, subsequent to the first time: capturing a second radio image of the object in the environment from a second point of view; capturing a second camera image of the environment from the second point of view; determining a trajectory of an imager from the first point of view to the second point of view between the first time and the second time based on accelerometer data; determining a positional shift based on a photogrammetrical difference between the first camera image and the second camera image; determining a first position of the imager in the environment at the first time and a second position of the imager in the environment at the second time based on the trajectory and the photogrammetrical difference; merging the first radio image with the second radio image based on the first position and the second position to produce a synthetic aperture radar image of the object; and outputting the synthetic aperture radar image.

According to one embodiment of the present invention, a method of operation for a portable imager is provided, the method including: capturing a plurality of radar readings related to an object in an environment at a corresponding plurality of times from a corresponding plurality of Points of View (POV), wherein each radar reading of the plurality of radar readings indicate a distance to the object relative to an imager at a corresponding time of the plurality of times and a reflectivity of the object; capturing a plurality of camera images of the environment at the corresponding plurality of times from the corresponding plurality of POVs over a trajectory; determining a plurality of positional shifts based on photogrammetrical differences between subsequent camera images of the plurality of camera images; determining, based on accelerometer data, a trajectory that the imager moves in the environment over the plurality of times; determining a plurality of positions of the imager in the environment over the plurality of times based on the plurality of positional shifts and the trajectory; combining the plurality of radar readings based on the plurality of positions to produce a synthetic aperture radar image of the object; and outputting the synthetic aperture radar image.

According to one embodiment of the present invention, a system operable as a portable imager is provided, the system including: a processor; and a memory storage device, including instructions that when executed by the processor enable the system to: at a first time: capture a first radio image of an object in an environment from a first point of view; and capture a first camera image of the environment from the first point of view; and at a second time, subsequent to the first time: capture a second radio image of the object in the environment from a second point of view; capture a second camera image of the environment from the second point of view; determine a trajectory of an imager from the first point of view to the second point of view between the first time and the second time based on accelerometer data; determine a positional shift based on a photogrammetrical difference between the first camera image and the second camera image; determine a first position of the imager in the environment at the first time and a second position of the imager in the environment at the second time based on the trajectory and the photogrammetrical difference; merge the first radio image with the second radio image based on the first position and the second position to produce a synthetic aperture radar image of the object; and output the synthetic aperture radar image.

DETAILED DESCRIPTION

Figure 1:
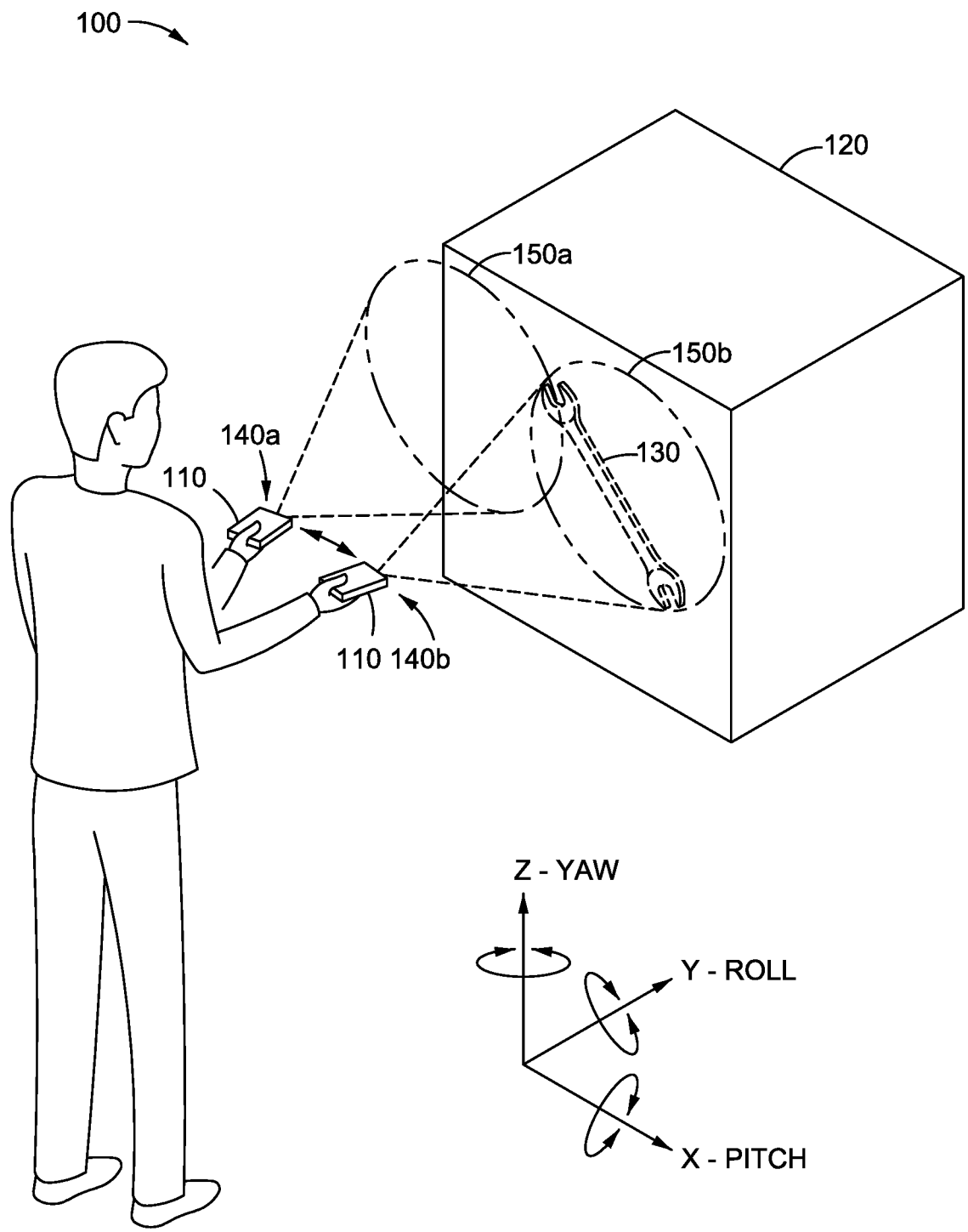
FIG. 1 illustrates an environment in which a user of an imager scans an obstructive object to determine whether a hidden object is present in or behind the obstructive object, according to embodiments of the present disclosure.

An imaging device using millimeter (mm) wavelength radio waves enables users to identify objects concealed or obscured by other objects, as radio waves with wavelengths in the mm range (from approximately 1 mm to 10 mm±10% with frequencies from approximately 30 GHz to 300 GHz±10%) are low energy (i.e., non-ionizing) and are reflected by metallic objects, but are able to pass through several non-metallic objects, to thereby reveal concealed objects that would not be otherwise visible to the eye. Millimeter waves, however, have a greater wavelength than visible light, and the resulting radar images tend to have a course resolution compared to visible light images unless a larger aperture of millimeter wave imager is used. To provide a full image of the object being scanned, the imaging device may employ a large aperture receiving antenna, a phased antenna array, or a synthetic aperture radar (SAR). Using a large enough aperture of antenna or a phased array may be impractical in many devices due to the form factors of the employed antennas and the necessary components to electronically redirect the signals from a single location and the distances that the imaging devices are held at relative to the objects being scanned. Therefore, some millimeter wave imaging devices use a SAR schema with precise motion control to provide several views of portions of an object being scanned to merge into a full view of the object and/or several perspectives to build a three dimensional image of the object. These motion-controlled millimeter wave image devices, however, are not portable and are bulky; preventing users from employing millimeter wave imaging in several useful situations.

When using a SAR schema to form an image using radar information taken from several positions in the environment, the level of accuracy used in determining those positions is commensurate with the wavelengths used to produce the images. In an imaging device using signals with wavelengths of millimeters (mm) (e.g., between 0.1 and 1000 millimeters), the accuracy at which positions are resolved is also at least within millimeters. To achieve the accuracies fine enough to resolve millimeter wave generated radio images, mechanical rigs using motors with precise motion control (or mechanical interlocks with known positional effects) are often used so that the imaging device is moved to positions with known positions relative to the objects being imaged. However, these mechanical rigs have a priori knowledge of the pathways that the imaging device will travel, limiting their effectiveness in scanning objects in unknown environments, and the portability of the imaging devices. The present disclosure provides systems and methods for presenting and using imaging devices with improved functionality over prior imaging devices to enable a user to obtain radar images by moving a portable imaging device without a priori knowledge of the positioning in the environment of the device, or the object(s) being scanned, or the trajectory of motion, or the use of precise motion control/mechanical interlocks.

FIG. 1 illustrates an environment 100 in which a user of an imager 110 scans an obscuring object 120 to determine whether a hidden/concealed object 130 is present in or behind the obscuring object 120. The user moves the imager 110 from a first position 140a (generally, position 140) with a first Point of View (POV) 150a (generally, POV 150) to a second position 140b with a second POV 150b. The two POVs 150 in FIG. 1 are illustrative of a SAR schema; providing two sets of radar readings taken along a trajectory in the environment 100 that are resolved into a single radar image, although a SAR schema typically includes capturing more than two sets of radar readings from more than two POVs 150, the present disclosure uses examples with two radar readings captured at two corresponding POVs 150 so as not to distract from the other aspects discussed herein. One of ordinary skill in the art will appreciate that several subsequent or interstitial radar readings may be added to the discussed first and second radar readings based on the relative POV 150 at which those radar readings are captured along the trajectory. Moreover, although examples are given using a SAR schema, the imager 110 of the present disclosure may use a SAR schema alone or in combination with other forms of beamforming or beam scanning (e.g. a phased array) to further expand the scanning area of the imager 110 and further improve the performance of the imager 110.

In one embodiment, the imager 110 includes an active radio frequency (RF) radar 225 that the user moves in the environment 100 rather than relying on motors or mechanical rigs to control the positioning of the imager 110. As such, the imager 110 has six degrees of freedom in the environment that the imager 110 tracks and compensates for as the user moves the imager 110. When viewing the environment according to Cartesian coordinates, a user may move the imager 110 in one or more of the X, Y, or Z axes, and rotate the imager around one or more of the X, Y, and Z axes (also referred to as yaw, pitch, and roll). Therefore, changes to positions 140 of the imager 110 may include changes to the location (e.g., at least one different X, Y, or Z coordinate) or changes to the orientation (e.g., at least one rotation about an X, Y, or Z axis) of the imager 110. In one example, the user may attempt to hold the imager 110 in one location and pan the imager 110 back and forth (e.g., imparting a yaw, pitch, or roll) to produce radio images from different POVs 150. In another example, the user may attempt to keep the imager 110 steady (e.g., not impart a rotation) and move the imager 110 to new X, Y, and Z coordinates.

Due to the imprecision of human movement compared to mechanized systems, a user's attempts to precisely move the imager 110 to provide radio imaging captured from several POVs 150 will likely fall short of the precision and smooth range of motion of a mechanical rig. A user may wobble, jerk, bobble, sway, etc., when moving the imager 110 and unconsciously or unintentionally impart changes in position that affect the ability of the imager 110 to form a coherent radio image with the multiple measurements. To compensate for the human user's imprecision, the imager 110 tracks the positions 140 of the imager 110 over time using various sensors and associates the tracked positions 140 with the corresponding radar data received over that period of time.

Because the imager 110 has a form factor that allows the user to move the imager 110 relative to objects and view the environment 100 simultaneously, the imager 110 provides the user with additional context on the resulting radar image. The user can see the environment 100, the objects therein, and understand where obscuring objects 120 and concealed objects 130 are located relative to one another. In some embodiments, the imager 110 overlays the radio-based images of concealed objects 130 over visible-light-based camera images of the environment 100 and the obscuring objects 120. In other embodiments, the imager 110 displays the radio-based image of concealed objects 130 and the user can see the environment 100 and correlate where the imager 110 has been scanned with the radar image produced.

Figure 2:
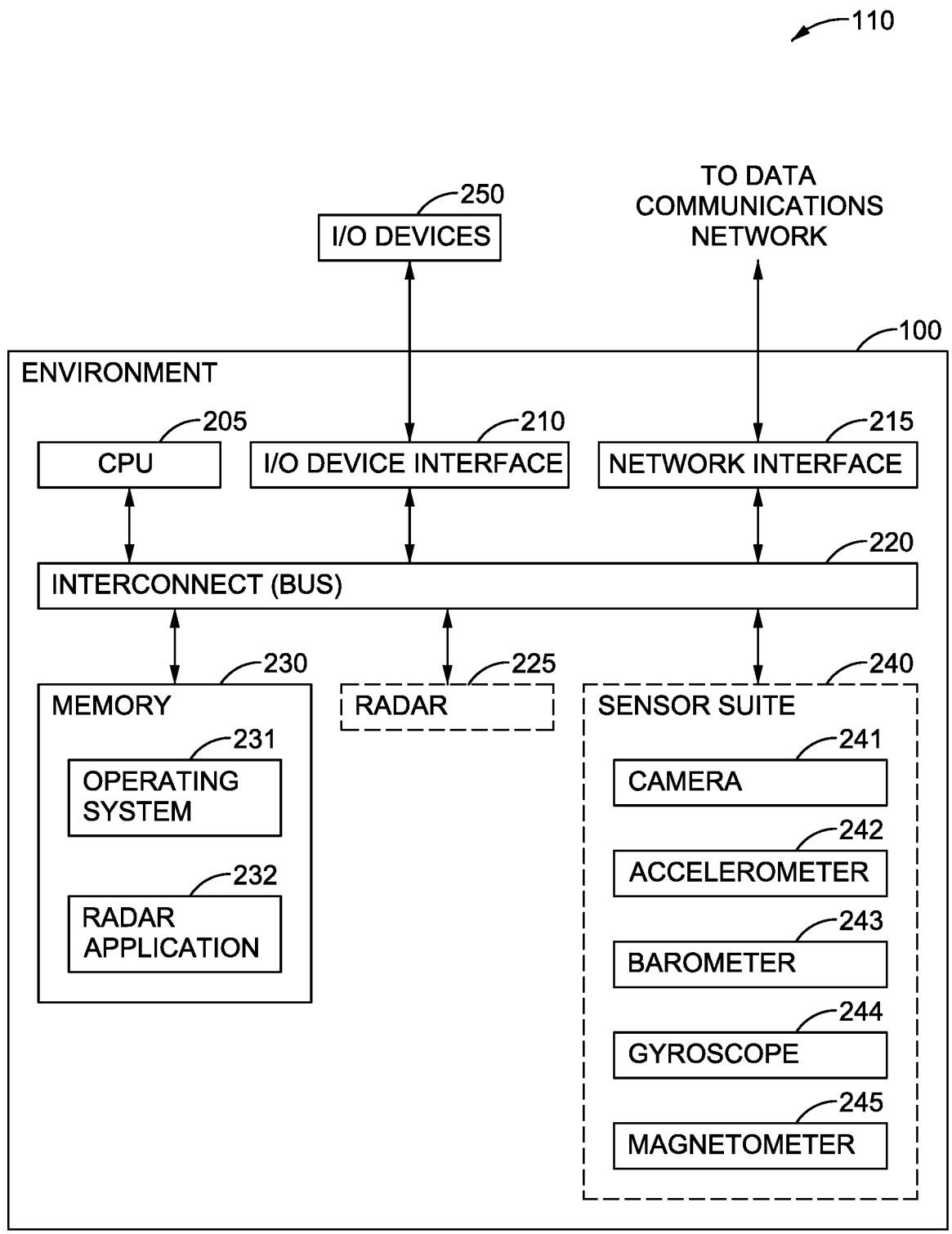
FIG. 2 illustrates computing components of an imager, according to embodiments of the present disclosure.

FIG. 2 illustrates computing components of the imager 110, which may be a personal computer, a laptop, a tablet, a smartphone, a digital camera, etc. As shown, the imager 110 includes, without limitation, a central processing unit (CPU) 205, a network interface 215, an interconnect 220, and a memory 230. The imager 110 may also include an I/O device interface 210 connecting I/O devices 250 (e.g., keyboard, display, and mouse devices) to the imager 110. In various embodiments, some of the components of the imager 110 may be located in different devices as part of a distributed system or an accessory added to an existing system so long as the radar 225 and the sensor suite 240 are co-located.

The CPU 205 retrieves and executes programming instructions stored in the memory 230. Similarly, the CPU 205 stores and retrieves application data residing in the memory 230. The interconnect 220 facilitates transmission, such as of programming instructions and application data, between the CPU 205, I/O device interface 210, network interface 215, and memory 230. CPU 205 is included to be representative of a single CPU, multiple CPUs, a single CPU having multiple processing cores, and the like. And the memory 230 is generally included to be representative of both long and short term memory devices, such as, for example, a random access memory, a disk drive storage device, etc. Although shown as a single unit, the memory 230 may be a combination of fixed and/or removable storage devices, such as magnetic disk drives, flash drives, removable memory cards or optical storage, network attached storage (NAS), or a storage area-network (SAN). Further, although shown as a single computing system, one of ordinary skill in the art will recognized that the components of the imager 110 shown in FIG. 2 may be distributed across multiple computing systems connected by a data communications network.

As shown, the memory 230 includes an operating system 231 (e.g., Microsoft's Windows® Operating System), and radar application 232 for enabling the imager 110 to capture and output radar based images of objects within an environment.

The CPU 205 and the radar application 232 provide radar based images of objects in the environment with a radar 225 and a sensor suite 240. The radar 225 projects Radio Frequency (RF) signals into the environment, and receives reflected instances of those RF signals to determine the distances and reflectivity of various objects in the environment. In some embodiments, the radar 225 is a mm wave radar (mmWave), but may employ radar devices using different wavelengths of signals to determine the distance to various objects and the reflectivity of those objects to the chosen wavelengths of range-finding signals. One of skill in the art will appreciate that signals of different wavelengths are able to pass through some materials, and will be blocked or reflected by other materials. For example, X-Rays (with wavelengths from approximately 0.01 to 10 nanometers (nm)) are able to pass through softer tissue, but are reflected by harder tissue (e.g., teeth, bone), while millimeter waves are reflected weakly by common packaging materials such as corrugated cardboard, carton, or wood and strongly by harder materials such as metals.

The radar application 232 uses several instances of radar readings received over time to generate a radar image from a synthetic aperture from the several POVs 150 over which the imager 110 is provided during the time window. To merge the sensor data into a synthetic aperture radar image, the radar application 232 pieces the data together based on positions of the imager 110 in the environment supplied by the sensor suite 240 over the same period of time.

The sensor suite 240 monitors the position of the imager 110 in the environment to enable the imager 110 to accurately track where the radar based images collected by the radar 225 were generated. The sensor suite 240 includes a camera 241 and an accelerometer 242, and may include one or more of a barometer 243, a gyroscope 244, and a magnetometer 245. The sensor suite 240 may include additional sensors, several instances of each sensor, or may omit some of the example sensors discussed herein.

The camera 241 captures images of the environment 100 using reflected light in the visible and near-visible spectrum (e.g., infrared and ultraviolet). The camera images may be captured as still or video images with varying resolutions in various embodiments. In some embodiments, the camera 241 is located on a surface of the imager 110 opposite to a display device of the imager 110 and coplanar to the receiving antennas of the radar 225 to capture camera images with the same POVs 150 as the radar data sets. The camera 241 provides several camera images that are taken at various points in time that provide several views of the environment at those times. A photogrammatical algorithm uses image recognition to determine changes in position for the imager 110 between the associated times of the successive camera images. For example, an $n^{th}$ camera image taken at time $t_n$ and an $(n+1)^{th}$ camera image taken at time $t_{(n+1)}$ indicate different views of the environment 100 (including the relative sizes and locations of objects in the environment 100) that the photogrammatical algorithm uses to determine a positional shift of the imager 110 between times $t_n$ and $t_{(n+1)}$.

The accelerometer 242, which measures acceleration forces acting on the imager 110, may provide the imager 110 with information of whether the imager 110 is moving, and in which direction(s). The radar application 232 may use the accelerometer 242 to determine a new positon of the imager 110 from an earlier position based on the speed and length of time at which the imager 110 is moved from an initial time to a final time.

The barometer 243 measures pressure in the environment in which the imager 110 is present, and may provide the imager 110 with information related to an altitude that the imager 110 is located at. The gyroscope 244 measures orientation of the imager 110, and may provide the imager 110 with information of whether the imager 110 is level or to what degree the imager 110 is tilted in one or more planes. The magnetometer 245 is a sensor that provides a bearing to a north pole of a magnetic field in the environment in which the imager 110 is present. The magnetometer 245 may thus provide the imager 110 with a directional sense in terms of yaw orientation with respect to magnetic north. The radar application 232 may combine measurements from the barometer 243, gyroscope 244, and magnetometer 245 to augment the positional readings generated by the accelerometer 242.

Figure 3:
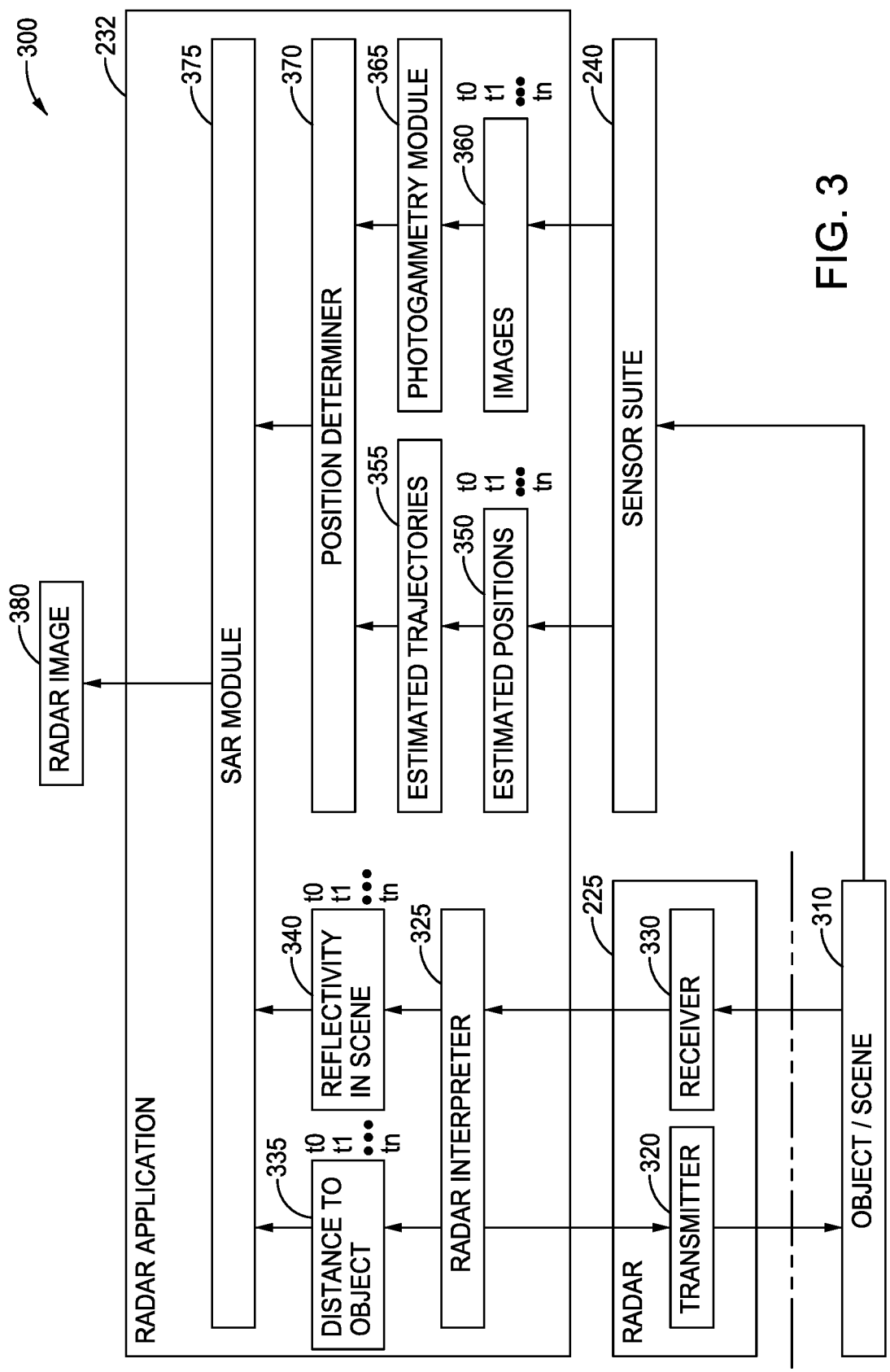
FIG. 3 is a block diagram of a flow for generating a radar image of an object/scene viewed by an imager using a synthetic aperture radar schema, according to embodiments of the present disclosure.

FIG. 3 is a block diagram of a flow 300 for generating a radar image 380 of an object/scene 310 viewed by an imager 110 using a synthetic aperture radar schema. The flow 300 includes data captured and manipulated in a time window with a series of sequential times from $t_0$ to $t_n$. The imager 110 captures radar readings and readings from other sensors such as accelerometer and/or camera images at times in the sequential times $t_0$ to $t_n$ and uses the time of capture to determine the series of positions (e.g., via a trajectory estimated from the other sensors) that the imager 110 travels over the course of time from $t_0$ to $t_n$.

The radar 225 generates and transmits radar signals via a transmitter 320 that are broadcast into the environment 100 within the POV 150 of the radar 225. As the user moves the imager 110 over a period of time from $t_0$ to $t_n$, several signals are generated to produce radar data sets. These signals are reflected off of various objects 310 in the environment 100, and a portion of the signals are received by a receiver 330 of the radar 225. A radar interpreter 325, as a module of the radar application 232, based on the received signals, determines a series of distances 335 to the objects 310 and a series of reflectivities 340 from the objects at the various times $t_0$ to $t_n$. In various embodiments, the radar interpreter 325 uses a phase shift or a frequency shift (e.g. a frequency modulated waveform) from the transmitted signals to the received signals to determine the series of distances 335 between the imager 110 and the objects 310 at various times. In one embodiment, the radar interpreter 325 may use the signal strength of the received signals relative to the transmitted signals to determine the series of reflectivities 340 from the objects at the various times $t_0$ to $t_n$.

The sensor suite 240 also uses information from the object/scene 310 to determine a series of positions of the imager 110 relative to the object 310.

A camera 241 of the sensor suite 240 captures a series of images 360 taken from time $t_0$ to $t_n$ as the user moves the imager 110, which a photogrammetry module 365 of the radar application 232 uses to help determine how the imager 110 has moved relative to the objects in the scene 310. Photogrammetry (and photogrammertical processes/data) uses image recognition to determine the relative sizes and locations of objects in a series of images 360 to determine where the imager 110 is located relative to changes in the visible environment. For example, a first camera image captured at a first time may show a first arrangement of the scene 310, and a second camera angle captured at a second time may show a second arrangement of the scene 310 that the photogrammetry module 365 compares to determine a shift of the imager 110 based on the different positions of the objects in the scene 310.

The other sensor data from the sensor suite 240 are used in parallel or separately from the series of images 360 to develop an estimated series of positions 350 and estimated trajectories 355 derived therefrom that the radar application 232 uses to help determine how the imager 110 has moved from time $t_0$ to $t_n$. The series of estimated positions 350 uses velocity data received from an accelerometer 242, which may be augmented with altitude data from a barometer 243, orientation data from a gyroscope 244, and heading data (relative to magnetic north) from a magnetometer 245. The estimated positions 350 are relative positions of the imager 110 during the scan, and do not require knowing the exact location of the imager 110 in space. Instead, the sensor suite 240 provides motion data from the accelerometer 242 and other sensors that track where the imager 110 is positioned in the environment relative to an initial position at time $t_0$ to develop a trajectory 355 for the imager 110 from time $t_0$ to $t_n$.

The position determiner 370 chooses how to interpret the one or more sets of positional information estimated by the sensor suite 240. In some embodiments, the position determiner 370 weights the positional determinations from various sensors based on environmental conditions and sensor conditions. For example, the position determiner 370 weights gyroscope data less than photogrammetrical orientation data when the radar application 232 determines that a gyroscope 244 is saturated. In another example, the position determiner 370 weights photogrammetrical data less than trajectory data in low-light conditions, in which the camera 241 determines that a light-level falls below a threshold for capturing visible-light images. In other embodiments, the position determiner 370 chooses to use one of the trajectories 355 or the photogrammetrical data to use as positional data for the imager 110 from time $t_0$ to $t_n$ (e.g., when the imager 110 omits a camera 241 or only includes a camera 241 in the sensor suite 240).

In one example, a user attempting to move the imager 110 from a first position to a second position in a straight line may, in fact, move the imager 110 on an uneven course with uneven speed. Because the imager 110 does not know the speeds, destination, or courses of the imager 110 will take before beginning the scan, the position determiner 370 uses the data from the photogrammetry module 365 and the estimated trajectories 355 to estimate the positions of the imager 110 as the user moves the imager 110 through the environment 100. The SAR module 375 then uses the radar data set and the chosen positional data to form a radar image 380 via a SAR algorithm.

A SAR module 375 of the radar application 232 receives the series of distances 335, series of reflectivities 340, and the chosen estimated positions of the imager 110 in the environment 100 at times $t_0$ to $t_n$ to produce a radar image 380 for output to a display device. The radar application 232 associates the series of distances 335, series of reflectivities 340, and the series of positions based on the times ($t_0$ to $t_n$) at which the data were collected. The radar application 232 associates the series of distances 335 and the series of reflectivities 340 with respect to the series of positions to determine how the imager 110 has been moved from time $t_0$ to time $t_n$ and adjusts how the measured series of distances 335 at each of time $t_0$ to $t_n$ and the measured series of reflectivities 340 at each of time $t_0$ to $t_n$ are to be merged together to form a radar image 380 developed from several POVs 150 in a SAR schema.

Figure 4:
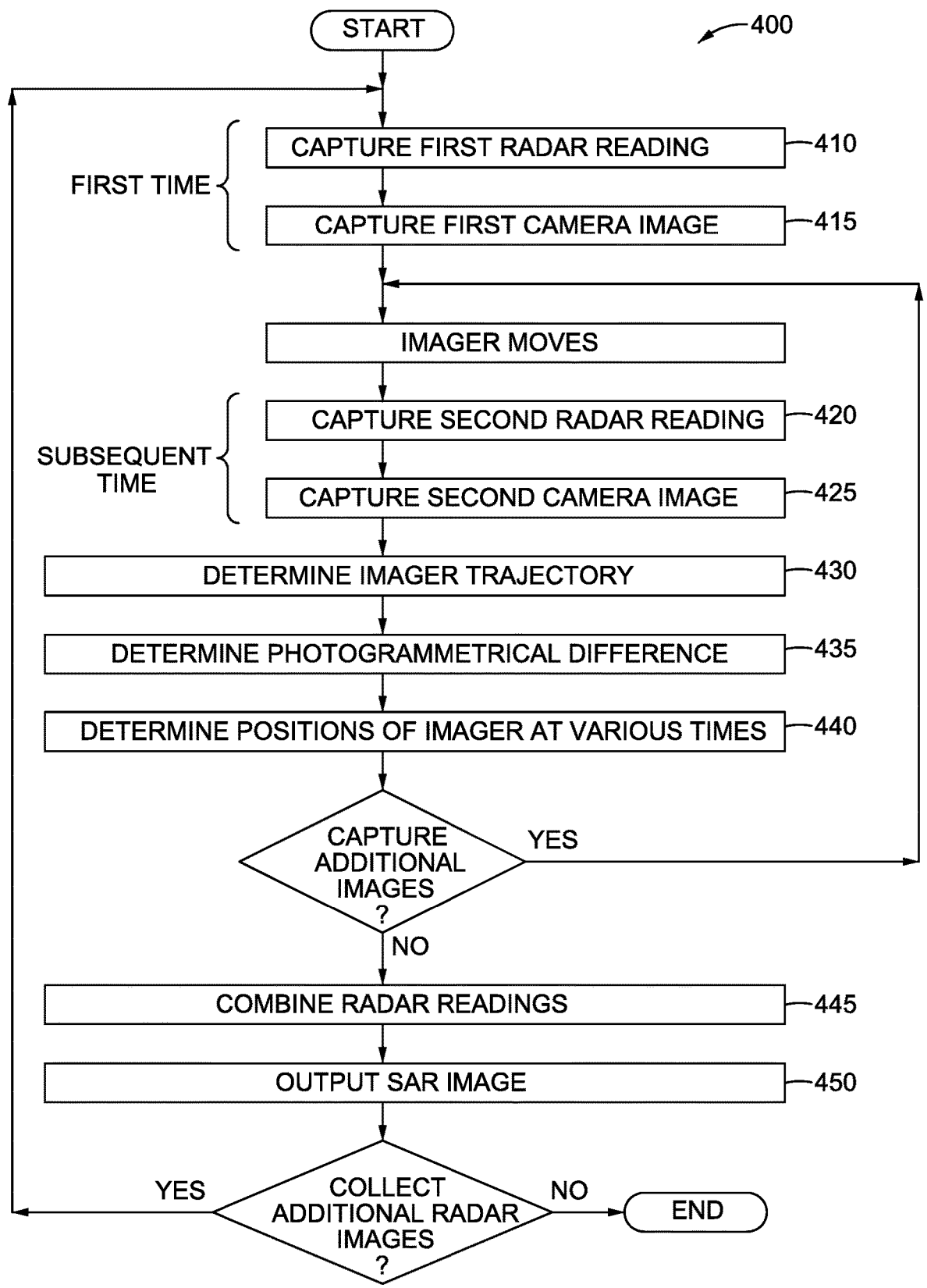
FIG. 4 is a flowchart of a method for generating a radar image of an object/scene viewed by an imager using a synthetic aperture radar schema, according to embodiments of the present disclosure.

FIG. 4 is a flowchart of a method 400 for generating a radar image 380 of an object/scene 310 viewed by an imager 110 using a synthetic aperture radar schema. The operations indicated in blocks 410 and 415 are processed at a first time, and the operations indicated in blocks 420-499 are processed subsequent to the first time. In various embodiments, block 420-499 are processed at a second time, while in other embodiments, blocks 420-425 are processed at a second time and blocks 430-499 are processed subsequent to the second time. Between each listed time, a user moves the imager 110 in the environment, and the position 140 of the imager 110 relative to the object 310 being scanned and in the environment 100 is not known a priori. Method 400 enables the imager 110 to form, using a SAR schema, a radar image 380 leveraging radar data taken from different estimated positions 140 in an environment 100.

In some embodiments, the discussed times are time windows that encompass several discreet times, and initial and subsequent times may be separated by a predefined amount of time. For example, the first and second times may define time windows of n nanoseconds in which the blocks taking place in therein may be occur in any order. In some embodiments an interstitial time period may separate the first time from the second time; the second time may begin n nanoseconds after the first time ends.

Method 400 begins at block 410, where the radar application 232, at a first time, captures a first radar reading of an object 310 in the environment 100 from a first POV 150a. To capture the first radar reading, the radar application 232 determines a reflectivity as a measure of signal strength of a radio signal reflected off of the object 310 and a distance to that object 310 from the imager 110 as a measure of phase shift, frequency shift, or time delay. At block 415, also at the first time, the radar application 232 captures a first camera image of the environment 100 from the first POV 150a using a visible or near-visible light camera 241.

At block 420, the radar application 232, at a second time, captures a second radar reading of the object 310 in the environment 100 from a second POV 150b. The second POV 150b may include a change in location (e.g., a change in X, Y, Z coordinates), a change in orientation (e.g., a yaw, pitch, or roll change), or both. For the second radar reading, like the first radar reading, the radar application 232 determines a reflectivity as a measure of signal strength of a radio signal reflected off of the object 310 and a distance to that object 310 from the imager 110 as a measure of phase shift, frequency shift, or time delay. The imager 110 may continuously transmit radio signals at a set time interval (e.g., every n milliseconds) to receive reflections thereof, or the imager 110 may transmit a radio signal in response to the imager 110 moving a set distance (e.g., in response to moving n mm or rotating n °).

At block 425, the radar application 232, at a second time, captures a second camera image of the environment 100 from the second POV 150b. In various embodiments, the radar application 232 recognizes various objects in the second camera image that are present in the first camera image that are sized differently, presented from a different angle, or presented in a different location of the camera image that indicate that the imager 110 or the object has moved relative to static objects in the camera images.

At block 430, the radar application 232, subsequent to the first time, determines a trajectory of the imager 110 from the first POV 150a to the second POV 150b between the first time and the second time. The radar application 232 builds the trajectory from estimated positions in the environment 100 for the imager 110 at various times. In various embodiments, the radar application 232 determines how far and what direction the imager 110 moved from a first position 140a (at the first time) to a second position 140b (at the second time) based at least in part on accelerometer data (gathered from an accelerometer 242 integrated in the imager 110) that indicates an acceleration vector for the imager 110 between the first and second times. For example, an accelerometer 242 in an imager 110 that is moved in an arc by the user may report accelerations experienced in various time windows indicating the magnitude and direction of the forces accelerating the imager 110 over the course of the arc from the first time to the second time. The radar application 232 may also use barometer data from a barometer 243 that indicates a first altitude at the first time and a second altitude at the second time; gyroscope data from a gyroscope 244 that indicates a first orientation of the imager 110 at the first time and a second orientation of the imager 110 at the second time; and magnetometer data from a magnetometer 245 that indicates a first heading of the imager 110 relative to magnetic north at the first time and a second heading of the imager 110 relative to magnetic north at the second time.

At block 435, the radar application 232 determines a photogrammetrical difference between the first camera image and the second camera image to determine a positional shift affected on the imager 110 from the first time to the second time. A photogrammetry module 365 identifies various objects in the first and second camera images and correlates the shifts in where those object appear (or no longer appear) in the first and second camera images to determine how far and which direction the POVs 150 have shifted.

At block 440, the radar application 232 uses the trajectory and the photogrammetrical difference to determine a first position 140a of the imager 110 in the environment 100 at the first time and a second position 140b of the imager 110 in the environment 100 at the second time. For example, the trajectory may indicate that the imager 110 has rotated by n ° around one or more axes and moved m meters in one or more planes, and the photogrammetrical difference that the POVs 150 of the imager 110 have shifted by n ° around one or more axes and moved m meters in one or more planes. The radar application 232 uses the trajectory and the photogrammetrical difference as complementary positional determiners to refine the precision and accuracy at which the imager 110 is determined to be positioned in the environment 100 over using one of the trajectory or photogrammaetrical difference. In various embodiments, the radar application 232 averages the positional determinations between the trajectory and photogrammetrical difference. In other embodiments, the radar application 232 weights the positional determinations based on environmental conditions and sensor conditions. For example, the radar application 232 may weight gyroscope data less than photogrammetrical orientation data when the radar application 232 determines that a gyroscope 244 is saturated. In another example, the radar application 232 may weight photogrammetrical data less than trajectory data in low-light conditions, in which the camera 241 determines that a light-level falls below a threshold for capturing visible-light images.

Method 400 may proceed to block 445 after block 440, or may return to block 420 to collect third/fourth/fifth/etc. radio images and camera images at third/fourth/fifth/etc. times, which are used to further expand the synthetic aperture of the imager 110 and provide additional detail in the radar image 380.

At block 445, the radar application 232 merges the first radio image with the subsequent radio images to produce a synthetic aperture radar image 380 of the object 310. The radar application 232 stamps each of the radio images captured with the determined position 140 in the environment 100 at the associated time and, via a SAR module 375, combines the multiple radio images to form one coherent radar image of the object 310. The SAR module 375 may use various algorithms to determine where the detected objects/reflected signals are to be output in a two-dimensional radar image 380. In some embodiments, areas associated with more or stronger reflections are displayed at greater contrast in the radar image than areas of fewer or weaker reflections, thus providing a radar image 380 that may illustrate concealed objects 130 that are reflective of the wavelengths used by the imager 110.

At block 450, the radar application 232 outputs the synthetic aperture radar image 380. A display device on the imager 110 on an opposite face of the imager 110 from the camera 241 and antennas for the radar 225 may provide the user with a view of the environment and the radar image 380 at the same time. In some embodiments, the imager 110 stores the radar image 380 to a memory 230 or transmits the radar image 380 to another device for output via a network interface 215. In various embodiments, the radar application 232 performs an image analysis on the radar image 380 to determine if the radar image 380 matches any known objects (e.g., keys, tools, components/products to be shipped) and outputs the determination along with the radar image 380 to the user.

Method 400 may conclude after block 450, or may return to block 410 to collect additional radar readings or radar images 380 which are used to further expand the synthetic aperture of the imager 110, provide additional detail in the radar image 380, and provide additional perspectives of the object being scanned (e.g., for a three dimensional view).

In various embodiments, the radar application 232 provides feedback to the user on how to perform a scan, which may be based on prior scans. For example, after a first scan, the radar application 232 may suggest to the user to move the imager 110 along a different course (e.g., via a high-left to a low-right trajectory in a first scan and via a low-left to high-right trajectory in a second scan to make an "X" over the object 310).

Figure 5:
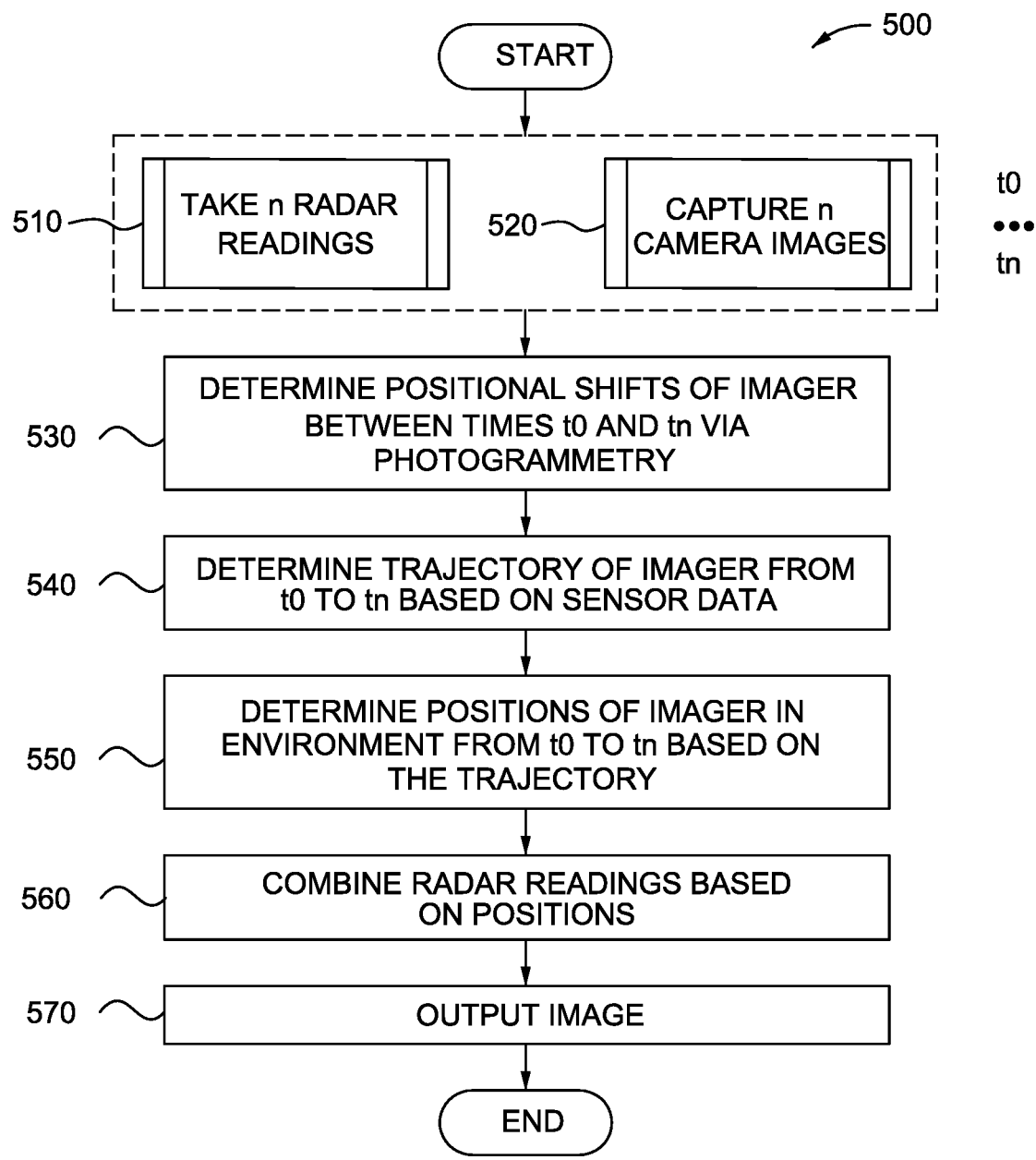
FIG. 5 is a flowchart of a method for generating a radar image of an object/scene viewed by an imager using a synthetic aperture radar schema, according to embodiments of the present disclosure.

FIG. 5 is a flowchart of a method 500 for generating a radar image 380 of an object/scene 310 viewed by an imager 110 using a synthetic aperture radar schema. Method 500 may be performed as a user moves an imager 110 in the environment 100 or in response to a user having completed a scan of the imager 110 through the environment. Method 500 may be understood in conjunction with method 400, using several repetitions of the blocks therein to provide a plurality of data points for radio imaging as discussed in relation to method 500.

Method 500 begins concurrently with block 510 and block 520. At block 510 a plurality of radar readings are taken of an object in the environment 100. At block 520, a plurality of camera images are taken of the environment. Each radar reading and camera image may be taken at a set time period (e.g., every n milliseconds) or in response to the imager 110 having moved a predefined distance. The radar readings indicate a reflectivity and a distance to the object relative to the imager 110 at a given time, and the camera images each capture a view of the environment 100 at the same times.

At block 530, the radar application 232 determines a plurality of positional shifts of the imager 110 in the environment 100 over the course of time that the imager 110 has moved/was moved between subsequent camera images of the plurality of camera images. For example, a photogrammatical difference of the imaged environment 100 between an $n^{th}$ and an $(n+1)^{th}$ camera image is used to determine how the imager 110 has been repositioned between times $t''$ and $t_{(n+1)}$.

At block 540, the radar application 232 determines, based on accelerometer data and other sensor data, a trajectory that the imager 110 has been physically moved in the environment 100 over the time period from $t_0$ to $t_n$. For example, accelerometer data may indicate various acceleration vectors that the radar application 232 uses to reconstruct how the imager 110 has moved from an initial position at time $t_0$ to a new position at time $t_n$ based on the forces applied to the imager 110. In various embodiments, data from other sensors may provide a plurality of altitude, orientation, and heading readings taken at times $t_0$ to $t_n$ to augment the accelerometer data in determining the trajectory of the imager 110 from time $t_0$ to time $t_n$. In some embodiments, the positional shifts are used as additional data to determine the trajectory of the imager 110.

At block 550, the radar application 232 uses the trajectory and the positional shifts to determine a plurality of positions at the plurality of times that the imager 110 occupied at those times. The imager 110 does not have prior knowledge of where the initial position in the environment 100 at $t_0$ is, where the final position in the environment 100 at time $t_n$ is or will be, or where the intermediary positions between time $t_0$ and $t_n$ are or will be in the environment 100. Instead, the imager 110 tracks the positions relative to one another based off of one or more of the initial or the final position to determine the trajectory of the movements of the imager 110 during a scan of the environment 100.

At block 560, the radar application 232 combines the plurality of radar readings, based on the estimated positions of the imager 110 when making those radar readings (as determined per block 550) into a synthetic aperture radar image 380 of the object. The radar application 232 may use various synthetic aperture algorithms to combine the radar readings taken at various positions into a synthetic aperture radar image 380.

At block 570, the radar application 232 outputs the synthetic aperture radar image 380. A display device on the imager 110 on an opposite face of the imager 110 from the camera 241 and antennas for the radar 225 may provide the user with a view of the environment and the radar image 380 at the same time. In some embodiments, the imager 110 stores the radar image 380 to a memory 230 or transmits the radar image 380 to another device for output via a network interface 215. In various embodiments, the radar application 232 performs an image analysis on the radar image 380 to determine if the radar image 380 matches any known objects (e.g., keys, tools, components/products to be shipped) and outputs the determination along with the radar image 380 to the user. In various embodiments, the radar application 232 provides feedback to the user on how to perform a scan, which may be based on prior scans. For example, after a first scan, the radar application 232 may suggest to the user to move the imager 110 along a different course (e.g., via a high-left to a low-right trajectory in a first scan and via a low-left to high-right trajectory in a second scan to make an "X" over the object 310.

Method 500 may then conclude or repeat.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:
1. A method comprising:
   at a first time:
      capturing a first radio image of an object in an environment from a first point of view; and
      capturing a first camera image of the environment from the first point of view; and
   at a second time, subsequent to the first time:
      capturing a second radio image of the object in the environment from a second point of view;
      capturing a second camera image of the environment from the second point of view;
      determining a trajectory of an imager from the first point of view to the second point of view between the first time and the second time based on accelerometer data;
      determining a positional shift based on a photogrammetrical difference between the first camera image and the second camera image;
      determining a first position of the imager in the environment at the first time and a second position of the imager in the environment at the second time based on the trajectory and the photogrammetrical difference;

merging the first radio image with the second radio image based on the first position and the second position to produce a synthetic aperture radar image of the object; and outputting the synthetic aperture radar image.

2. The method of claim 1, wherein the first radio image is based on a first distance to the object from the imager and a first reflectivity of the object and the second radio image is based on a second distance to the object from the imager and a second reflectivity of the object.

3. The method of claim 2, wherein the imager determines the first distance by:

transmitting a first signal;

receiving a first reflection of the first signal; and measuring at least one of a phase shift, a frequency shift, and a time delay between the first signal and the first reflection to determine the first distance; and wherein the imager determines the second distance by:

transmitting a second signal;

receiving a second reflection of the second signal; and measuring at least one of a phase shift, a frequency shift, and a time delay between the second signal and the second reflection to determine the second distance.

4. The method of claim 3, wherein the imager determines the first reflectivity by measuring at a signal strength difference between the first signal and the first reflection, and wherein the imager determines the second reflectivity by measuring at a signal strength difference between the second signal and the second reflection.

5. The method of claim 3, wherein the first signal and the second signal have wavelengths between 0.1 and 1000 millimeters.

6. The method of claim 1, wherein the accelerometer data are augmented with at least one of:

barometer data indicating a first altitude at the first time and a second altitude at the second time;

gyroscope data indicating a first orientation of the imager at the first time and a second orientation of the imager at the second time; and magnetometer data indicating a first heading of the imager relative to magnetic north at the first time and a second heading of the imager relative to magnetic north at the second time.

7. The method of claim 1, wherein the imager is moved from the first position to the second position without prior knowledge of where the first position and the second position are relative to the object and without prior knowledge of where the first position and the second position are in the environment.

8. A method comprising:

capturing a plurality of radar readings related to an object in an environment at a corresponding plurality of times from a corresponding plurality of Points of View (POV), wherein each radar reading of the plurality of radar readings indicate a distance to the object relative to an imager at a corresponding time of the plurality of times and a reflectivity of the object;

capturing a plurality of camera images of the environment at the corresponding plurality of times from the corresponding plurality of POVs;

determining a plurality of positional shifts based on photogrammetrical differences between subsequent camera images of the plurality of camera images;

determining, based on accelerometer data, a trajectory that the imager moves in the environment over the plurality of times;

determining a plurality of positions of the imager in the environment over the plurality of times based on the plurality of positional shifts and the trajectory;

combining the plurality of radar readings based on the plurality of positions to produce a synthetic aperture radar image of the object; and outputting the synthetic aperture radar image.

9. The method of claim 8, wherein a first radar reading of the plurality of radar readings provides a first distance to the object at a first time of the plurality of times from a first POV of the plurality of POVs determined by:

transmitting a first signal;

receiving a first reflection of the first signal; and measuring at least one of a phase shift, a frequency shift, and a time delay between the first signal and the first reflection to determine the first distance.

10. The method of claim 9, wherein the imager determines the first reflectivity by measuring at a signal strength difference between the first signal and the first reflection.

11. The method of claim 9, wherein the first signal has a wavelength between 0.1 and 1000 millimeters.

12. The method of claim 8, wherein the accelerometer data are augmented with at least one of:

barometer data indicating a plurality of altitudes at the plurality of times;

gyroscope data indicating a plurality of orientations of the imager at the plurality of times; and magnetometer data indicating a plurality of headings of the imager at the plurality of times.

13. The method of claim 8, wherein the imager is moved from a first position of the plurality of positions to a final position of the plurality of positions without prior knowledge of where the first position and the final position are relative to the object and without prior knowledge of where the first position and the final position are in the environment.

14. The method of claim 13, wherein the imager is moved from the first position to the final position without prior knowledge of intermediary positions of the plurality of positions.

15. A system, comprising:

a processor; and a memory storage device, including instructions that when executed by the processor enable the system to:

at a first time:

capture a first radio image of an object in an environment from a first point of view; and capture a first camera image of the environment from the first point of view; and at a second time, subsequent to the first time:

capture a second radio image of the object in the environment from a second point of view;

capture a second camera image of the environment from the second point of view;

determine a trajectory of an imager from the first point of view to the second point of view between the first time and the second time based on accelerometer data;

determine a positional shift based on a photogrammetrical difference between the first camera image and the second camera image;

determine a first position of the imager in the environment at the first time and a second position of the imager in the environment at the second time based on the trajectory and the photogrammetrical difference;

merge the first radio image with the second radio image based on the first position and the second position to produce a synthetic aperture radar image of the object; and output the synthetic aperture radar image.

16. The system of claim 15, wherein the first radio image is based on a first distance to the object from the imager and a first reflectivity of the object and the second radio image is based on a second distance to the object from the imager and a second reflectivity of the object.

17. The system of claim 16, wherein the imager determines the first distance by:
transmitting a first signal;
receiving a first reflection of the first signal; and
measuring at least one of a phase shift, a frequency shift, and a time delay between the first signal and the first reflection to determine the first distance; and
wherein the imager determines the second distance by:
transmitting a second signal;
receiving a second reflection of the second signal; and
measuring at least one of a phase shift, a frequency shift, and a time delay between the second signal and the second reflection to determine the second distance.

18. The system of claim 17, wherein the imager determines the first reflectivity by measuring at a signal strength difference between the first signal and the first reflection, and wherein the imager determines the second reflectivity by measuring at a signal strength difference between the second signal and the second reflection.

19. The system of claim 15, wherein the accelerometer data are augmented with at least one of:
barometer data indicating a first altitude at the first time and a second altitude at the second time;
gyroscope data indicating a first orientation of the imager at the first time and a second orientation of the imager at the second time; and
magnetometer data indicating a first heading of the imager relative to magnetic north at the first time and a second heading of the imager relative to magnetic north at the second time.

20. The system of claim 15, wherein the imager is moved from the first position to the second position without prior knowledge of where the first position and the second position are relative to the object and without prior knowledge of where the first position and the second position are in the environment.

* * * * *